United States Patent
Kim (10) Patent No.: US 9,543,612 B2
(45) Date of Patent: Jan. 10, 2017

(54) RECHARGEABLE BATTERY

(75) Inventor: Dukjung Kim, Yongin-si (KR)

(73) Assignees: SAMSUNG SDI CO., LTD., Yongin-si, Gyeonggi-do (KR); ROBERT BOSCH GmbH, Stuttgart (DE)

(*) Notice: Subject to any disclaimer, the term of this patent is extended or adjusted under 35 U.S.C. 154(b) by 1409 days.

(21) Appl. No.: 13/343,112

(22) Filed: Jan. 4, 2012

(65) Prior Publication Data

US 2012/0214050 A1    Aug. 23, 2012

(30) Foreign Application Priority Data

Feb. 22, 2011   (KR) .................. 10-2011-0015391

(51) Int. Cl.
| | |
|---|---|
| H01M 2/26 | (2006.01) |
| H01M 10/04 | (2006.01) |
| H01M 10/052 | (2010.01) |
| H01M 10/0587 | (2010.01) |

(52) U.S. Cl.
CPC ........... *H01M 10/0468* (2013.01); *H01M 2/26* (2013.01); *H01M 2/263* (2013.01); *H01M 10/0431* (2013.01); *H01M 10/052* (2013.01); *H01M 10/0587* (2013.01); *Y02E 60/122* (2013.01); *Y02T 10/7011* (2013.01)

(58) Field of Classification Search
CPC ............................... H01M 2/26; H01M 2/263
USPC ................................................. 429/161–177
See application file for complete search history.

(56) References Cited

U.S. PATENT DOCUMENTS

2012/0052341 A1*  3/2012  Kim ................ H01M 2/043
                                                   429/53

FOREIGN PATENT DOCUMENTS

| JP | 06-111795 A | 4/1994 |
|---|---|---|
| JP | 10-031989 A | 2/1998 |
| JP | 2004119199 A * | 4/2004 |
| JP | 2010-050111 A | 3/2010 |
| KR | 10-2006-0106463 A | 10/2006 |
| KR | 10-2006-0115022 A | 11/2006 |

OTHER PUBLICATIONS

Machine Translation of JP 2004-119199 originally published on Apr. 15, 2004 to Seyama.*

* cited by examiner

*Primary Examiner* — Jonathan G Leong
(74) *Attorney, Agent, or Firm* — Lee & Morse P.C.

(57) ABSTRACT

A rechargeable battery includes an electrode assembly, a first current collecting plate and a second current collecting plate spaced apart from each other and electrically connected to first and second electrode uncoated regions n the electrode assembly, a case receiving the electrode assembly, a cap plate sealing the case, a first electrode terminal and a second electrode terminal extending through the cap plate and electrically connected to the first and second current collecting plates, a first retainer adjacent to the cap plate and coupled to firsts regions of the first and second current collecting plates, and a second retainer coupled to second regions of the first and second current collecting plates or to the first and second electrode uncoated regions, the first and second regions of the first and second current collecting plates being different from each other.

13 Claims, 10 Drawing Sheets

RECHARGEABLE BATTERY

BACKGROUND

1. Field of the Invention

Embodiments relate to a rechargeable battery.

2. Description of the Related Art

Unlike primary batteries, which cannot be recharged, rechargeable batteries can be repeatedly charged and discharged. Low capacity rechargeable batteries that use single battery cells may be used as power sources for various portable electronic devices, e.g., cellular phones and camcorders. High capacity rechargeable batteries that use tens of battery cells connected to each other in a battery pack may be used as power sources for driving motors, e.g., electric scooters and hybrid electric vehicles (HEV).

Rechargeable batteries may be classified into different types, e.g., cylindrical and prismatic types. A unit battery includes an electrode assembly having positive and negative electrodes and a separator interposed between the positive and negative electrodes, a case for receiving the electrode assembly, and a cap assembly for sealing the case. Positive and negative terminals outwardly extending from the cap assembly are electrically connected to the positive and negative electrodes, respectively.

SUMMARY

Embodiments provide a rechargeable battery with first and second retainers connected to the current collecting plates of an electrode assembly, thereby affixing the electrode assembly and preventing damage thereto due to external impacts.

Embodiments also provide a rechargeable battery with first and second retainers connected to the current collecting plates of an electrode assembly, thereby stabilizing connection therein and improving electrical reliability by preventing electrical shorts.

Embodiments further provide a rechargeable battery with an elastic plate coupled to a retainer connected to the current collecting plates of an electrode assembly, thereby allowing the elastic plate to serve as an elastic body during welding and improving durability by absorbing vibration energy.

According to an embodiment, a rechargeable battery is provided, including an electrode assembly including a first electrode having a first electrode uncoated region at a first end of the electrode assembly, a second electrode having a second electrode uncoated region at a second end of the electrode assembly opposite the first end, and a separator interposed between the first and second electrodes, a first current collecting plate and a second current collecting plate spaced apart from each other, the first and second current collecting plates being electrically connected to the first and second electrode uncoated regions, respectively, a case configured to receive the electrode assembly, the first current collecting plate, and the second current collecting plate, a cap plate configured to seal the case, a first electrode terminal and a second electrode terminal extending through the cap plate, the first and second electrode terminals being electrically connected to the first and second current collecting plates, respectively, a first retainer adjacent to the cap plate, the first retainer being coupled to a first region of each of the first and second current collecting plates, and a second retainer coupled to a second region of each of the first and second current collecting plates or to each of the first and second electrode uncoated regions, the second regions of the first and second current collecting plates being different from the first regions of the of the first and second current collecting plates.

The first regions of the first and second current collecting plates may be connected to the first and second electrode terminals, respectively, and the second regions of the first and second current collecting plates may extend from respective first regions, the second regions being bent with respect to the first regions.

The first retainer may include a first receiving part and a second receiving part, each of the first and second receiving parts having a receiving hole, and the first region of each of the first and second current collecting plates being inserted into a respective receiving hole, and a first supporting part connecting the first receiving part and the second receiving part.

The first supporting part may be perpendicular to each of the first receiving part and the second receiving part.

Each of the first receiving part and the second receiving part may further include outer sidewalls and inner sidewalls, the inner sidewalls having an opening hole open in a vertical direction, and left sidewalls and right sidewalls, the left and right sidewalls connecting the outer sidewalls and the inner sidewalls.

The first electrode uncoated region and the second electrode uncoated region may be connected to the first current collecting plate and the second current collecting plate through the opening holes of respective first and second receiving parts of the first retainer.

The second retainer may include a first connection part and a second connection part, each of the first and second connection parts having coupling holes, and the second regions of each of the first and second current collecting plates being inserted into respective coupling holes, and a second supporting part connecting the first connection part and the second connection part.

The second supporting part may be perpendicular to each of the first connection part and the second connection part.

Each of the first connection part and the second connection part may include outer sidewalls and inner sidewalls, the inner sidewalls including slits, left and right sidewalls connecting the outer sidewalls and the inner sidewalls, and pillar parts connecting the outer sidewalls and the inner sidewalls, the pillars being arranged to have the slits in left and right sides thereof in a vertical direction.

The second retainer may further include a first coupling hole and a second coupling hole at respective first and second sides of the pillar parts.

The pillar parts may further include protrusions on at least one side surface of each pillar part, and the second regions of the first and second current collecting plates may include coupling holes.

The protrusions may be coupled to the coupling holes.

The second supporting part tightly may contact a bottom surface of the case.

The second supporting part may include at least one opening hole.

An elastic plate may be mounted in the opening hole.

The elastic plate may include a downwardly convex round part, and an edge part fixed to the second supporting part of the second retainer.

The elastic plate may further include a stepped portion at an end of the edge part, at least one end of the elastic plate being coupled to the stepped portion.

The first connection part and the second connection part may include a first sidewall and a second sidewall, respectively, and the first sidewall and the second sidewall may surround either side surfaces of the electrode assembly positioned under the second regions of the first and second current collecting plates.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2011-0015391, filed on Feb. 22, 2011, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
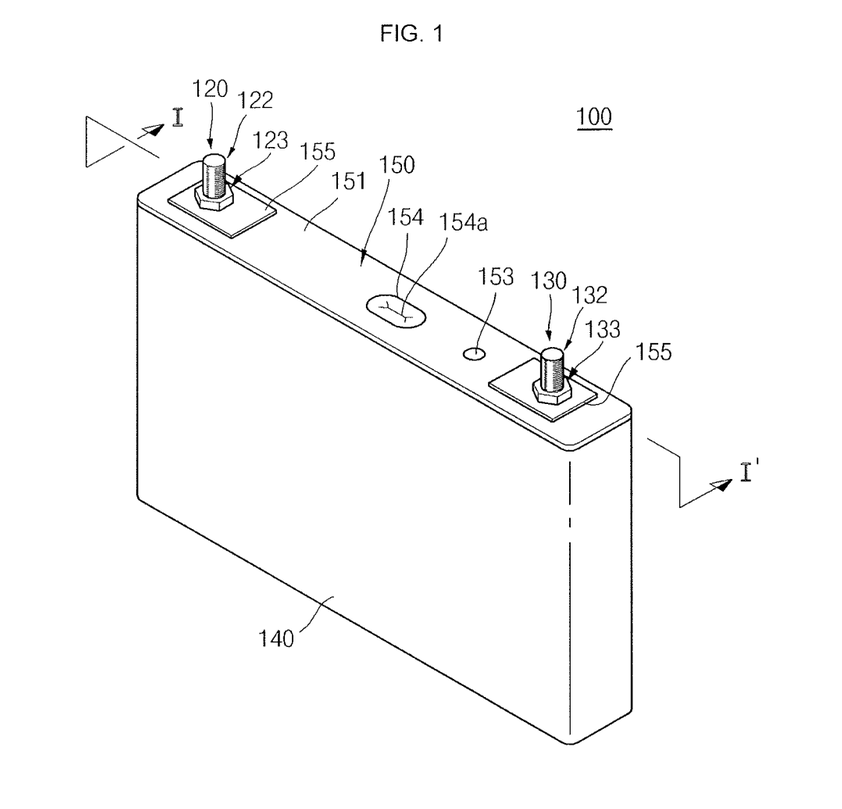
FIG. 1 illustrates a perspective view of a rechargeable battery according to an embodiment.
Figure 3:
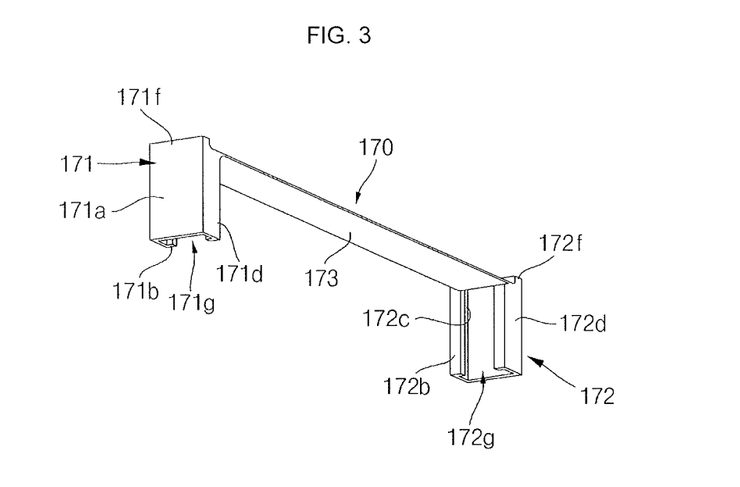
FIG. 3 illustrates a perspective view of a first retainer shown in FIG. 2.
Figure 4:
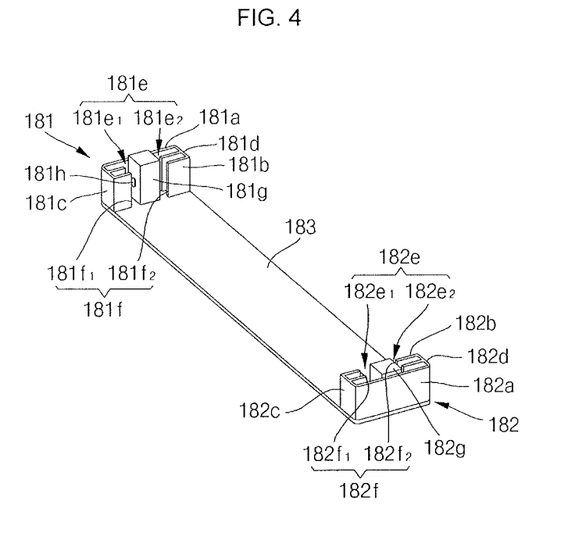
FIG. 4 illustrates a perspective view of a second retainer shown in FIG. 2.

Hereinafter, exemplary embodiments will be described in detail with reference to FIGS. 1-4. FIG. 1 is a perspective view of a rechargeable battery according to an embodiment FIG. 2 is a cross-sectional view of the rechargeable battery along line I-I' of FIG. 1, FIG. 3 is a perspective view of a first retainer shown in FIG. 2, and FIG. 4 is a perspective view of a second retainer shown in FIG. 2.

Figure 2:
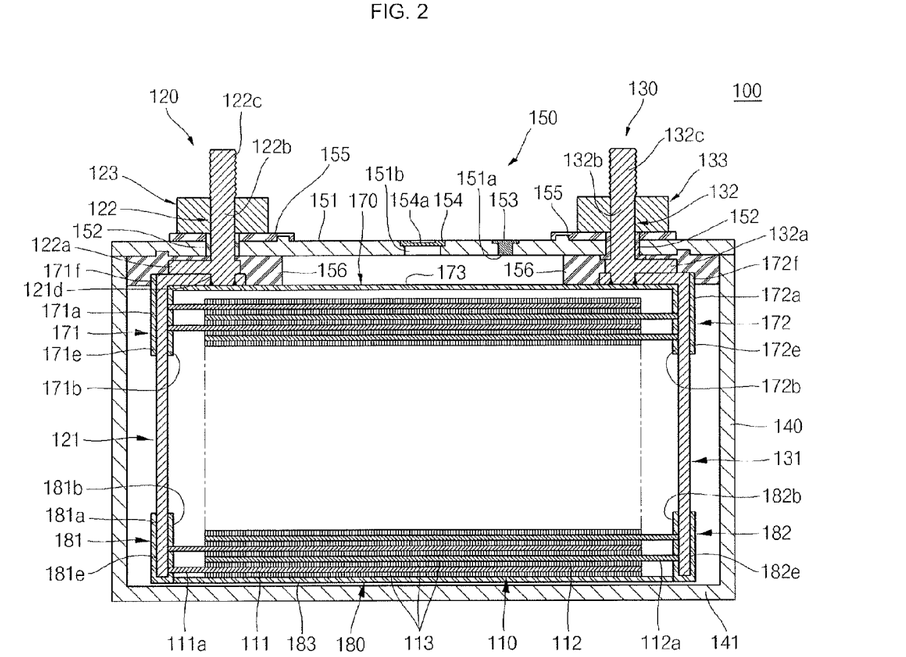
FIG. 2 illustrates a cross-sectional view of the rechargeable battery along line I-I' of FIG. 1.

Referring to FIGS. 1 and 2, a rechargeable battery 100 according to example embodiments may include an electrode assembly 110, a first terminal 120, a second terminal 130, a case 140, and a cap assembly 150. The rechargeable battery 100 may further include first and second retainer 170 and 180, as will be described in more detail below.

The electrode assembly 110 may be formed by winding a stack of a first electrode plate 111, a separator 113, and a second electrode plate 112 or by stacking the stack together. Here, the first electrode plate 111 may operate as a negative electrode and the second electrode plate 112 may operate as a positive electrode, or vice versa. The electrode assembly 110 may be stacked in a substantially jelly-roll configuration.

The first electrode plate 111 may be formed by coating a first electrode active material, e.g., graphite or carbon, on a first electrode collector formed of a metal foil, e.g., made of copper or nickel, and includes a first electrode uncoated region 111a, i.e., a region not coated with the first electrode active material, formed at a first end of the first electrode plate 111. However, the material of the first electrode plate 111 is not limited thereto. The first electrode uncoated region 111a becomes a path of the flow of current between the first electrode plate 111 and the outside thereof.

The second electrode plate 112 may be formed by coating a second electrode active material, e.g., a transition metal oxide, on a second electrode collector formed of a metal foil, e.g., made of aluminum, and includes a second electrode uncoated region 112a, i.e., a region not coated with a second electrode active material, formed at a second end of the second electrode plate 111, opposite to the first end of the first electrode plate 111. However, the material of the second electrode plate 112 is not limited thereto. The second electrode uncoated region 112a becomes a path of the flow of current between the second electrode plate 112 and the outside thereof.

The separator 113 may be interposed between the first electrode plate 111 and the second electrode plate 112 for preventing a short-circuit therebetween and for allowing movement of lithium ions. The separator 113 may be formed of, e.g., polyethylene (PE), polypropylene (PP), or a composite film of PE and PP. However, the material of the separator 113 is not limited thereto.

The electrode assembly 110 is accommodated in the case 140 with electrolyte. The electrolyte may include an organic solvent, e.g., ethylene carbonate (EC), propylene carbonate (PC), diethyl carbonate (DEC), ethyl methyl carbonate (EMC), or dimethyl carbonate (DMC), and a lithium salt, e.g., LiPF6 or LiBF4. The electrolyte may be a liquid, solid, and/or gel electrolyte.

A first terminal 120 and a second terminal 130 may be electrically connected to the first electrode plate 111 and the second electrode plate 112 at opposing ends of the electrode assembly 110, respectively. That is to say, the first terminal 120 and the second terminal 130 connected to the first uncoated region 111a of the first electrode plate 111 and the second uncoated region 112a of the second electrode plate 112, respectively, may be coupled to the opposing ends of the electrode assembly 110.

The first terminal 120 is generally made of a metal or equivalents thereof and is electrically connected to the first electrode plate 111. The first terminal 120 may include a first collector plate 121, a first electrode terminal 122, and a first terminal plate 123.

Figure 5A:
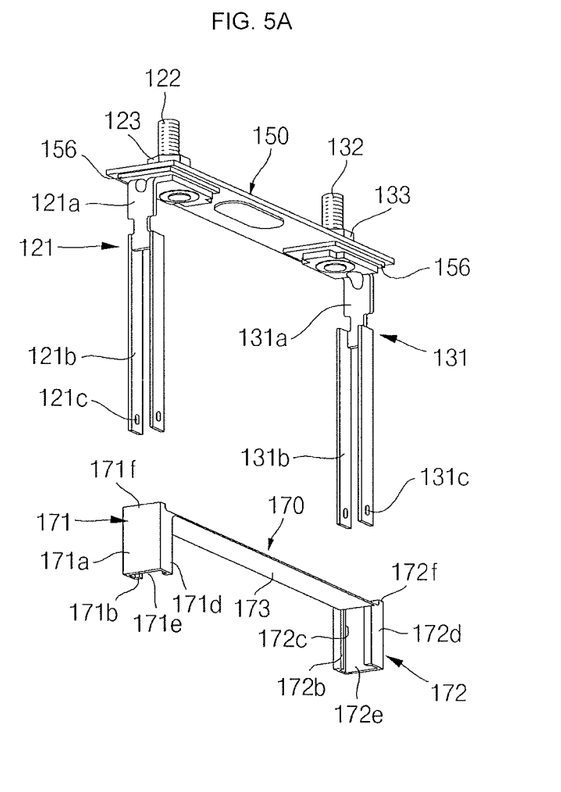
FIGS. 5A to 5D illustrate perspective views of a process of assembling a rechargeable battery according to an embodiment.

The first collector plate 121 contacts the first electrode uncoated region 111a protruding toward one end of the electrode assembly 110. For example, the first collector plate 121 may be welded to the first electrode uncoated region 111a. The first collector plate 121 may include a first region 121a and a second region 121b (FIG. 5A) and may be formed in an inverted-L shape, i.e., r-shape. The first region 121a may be shaped as a plate and may be connected to the first electrode terminal 122 (FIG. 5A). A terminal hole 121d may be formed at one side of the first region 121a. The first electrode terminal 122 may be inserted into and engaged with the terminal hole 121d. The second region 121b may extend from the first region 121a in a first direction, i.e., toward the first electrode uncoated region 111a. The first collector plate 121 may be made of, e.g., copper or a copper alloy, but not limited thereto. A coupling hole 121c (FIG. 5A) having a predetermined size may be formed in the second region 121b of the first collector plate 121. The coupling hole 121c may be engaged with a protrusion part 181h (FIG. 4) formed at one side surface or both side surfaces of a pillar part 181g (FIG. 4) of the second retainer 180, which will be described later.

The first electrode terminal 122 upwardly protrudes and extends by a predetermined length while extending through a cap plate 151 to be described later, and is electrically connected to the first collector plate 121 under the cap plate 151. The first electrode terminal 122 protrudes and extends by a predetermined length upwardly with respect to the cap plate 151, and includes a laterally extending flange 122a that may be formed under the cap plate 151 to prevent the first electrode terminal 122 from being dislodged from the cap plate 151.

A region of the first electrode terminal 122 formed under the flange 122a is fitted into the terminal hole 121d of the first collector plate 121 to be welded. A region of the first electrode terminal 122 formed above the flange 122a is fixed to the first terminal plate 123. That is to say, the region of the first electrode terminal 122 formed above the flange 122a includes a first body part 122b extending through the cap plate 151, and a first fastening part 122c threaded to the first terminal plate 123 at a top end of the first body part 122b. Here, a thread is formed on an outer circumference of the first fastening part 122c. Alternatively, the first fastening part 122c may be riveted to the first terminal plate 123. In addition, the first electrode terminal 122 may be electrically insulated from the cap plate 151. The first electrode terminal 122 may be made of, e.g., at least one of copper, a copper alloy, and equivalents thereof. However, the material of the first electrode terminal 122 is not limited thereto.

The first terminal plate 123 may be a nut shaped of a substantially hexagonal prism to be engaged with the first fastening part 122c. Alternatively, the first terminal plate 123 may be shaped such that a throughhole (not shown) may be centrally formed substantially in a vertical direction to allow the first electrode terminal 122 to extend therethrough to be engaged, and a groove (not shown) having a predetermined depth is formed substantially on its top portion to allow the first fastening part 122c to be safely placed therein. The first terminal plate 123 may be made of, e.g., at least one of stainless steel, copper, a copper alloy, aluminum, an aluminum alloy, and equivalents thereof, but not limited thereto. The first terminal plate 123 and the cap plate 151 are insulated from each other.

The second terminal 130 may also be made of a metal or equivalents thereof and may be electrically connected to the second electrode plate 112. The second terminal 130 may include a second collector plate 131, a second electrode terminal 132, and a second terminal plate 133. For example, the second terminal 130 may have the same shape as the first terminal 120, and a detailed description thereof will be omitted. The second collector plate 131 and the second electrode terminal 132 may be generally made of, e.g., at least one of aluminum, an aluminum alloy, and equivalents thereof, but not limited thereto. In addition, the second terminal plate 133 may be made of, e.g., at least one of stainless steel, aluminum, an aluminum alloy, copper, a copper alloy, and equivalents thereof, but not limited thereto. The second terminal plate 133 may be electrically connected to the cap plate 151, and thus the case 140 and the cap plate 151, which will be described later, may have the same polarity (e.g., a positive polarity) as the second terminal 130.

As illustrated in FIG. 2, the first retainer 170 may be connected to the first regions 121a and 131a of the first collector plate 121 and the second collector plate 131, respectively. In other words, the first retainer 170 may be connected to upper portions of the first collector plate 121 and the second collector plate 131, thereby increasing stability thereof. Similarly, the second retainer 180 may be connected to the second regions 121b and 131b. In other words, the second retainer 180 may be connected to bottom portions of the first collector plate 121 and the second collector plate 131, thereby further increasing stability thereof. It is noted, however, that while FIG. 2 illustrates that the second retainer 180 is connected to the second regions 121b and 131b of the first collector plate 121 and the second collector plate 131, example embodiments are not limited thereto. For example, the second retainer 180 may be connected to the first electrode uncoated region 111a and the second electrode uncoated region 112a. In another example, the second retainer 180 may be configured to surround exterior sides of the second regions 121b and 131b of the first collector plate 121 and the second collector plate 131.

In detail, as illustrated in FIG. 3, the first retainer 170 may include a first receiving part 171, a second receiving part 172, and a first supporting part 173.

The first receiving part 171 and the second receiving part 172 may include receiving holes 171e and 172e (FIG. 2) into which the first regions 121a and 131a of the first collector plate 121 and the second collector plate 131 are inserted. The first receiving part 171 and the second receiving part 172 may include outer sidewalls 171a and 172a, inner sidewalls 171b and 172b, and left and right sidewalls 171c, 171d, 172c and 172d connecting the outer sidewalls 171a and 172a and the inner sidewalls 171b and 172b. Top ends 171f and 172f of the outer sidewalls 171a and 172a are higher than the first supporting part 173 to cover the exterior sides of the first collector plate 121 and the second collector plate 131. In addition, the inner sidewalls 171b and 172b include opening holes 171g and 172g opened in an up-down direction, i.e., along a vertical direction. The opening holes 171g and 172g provide spaces in which the first regions 121a and 131a of the first collector plate 121 and the second collector plate 131 are received in the first receiving part 171 and the second receiving part 172, thereby allowing the first collector plate 121 and the second collector plate 131 to be assembled with the first receiving part 171 and the second receiving part 172 more easily. In addition, the first electrode uncoated region 111a and the second electrode uncoated region 112a are connected to the first collector plate 121 and the second collector plate 131 through the opening holes 171g and 172g.

The first supporting part 173 may be configured to connect the first receiving part 171 and the second receiving part 172. Here, locations where the first receiving part 171 and the second receiving part 172 are connected to the first supporting part 173 may have curved sections. That is to say, portions where the first receiving part 171 and the second receiving part 172 are connected to the first supporting part 173 are curved, so that the electrode assembly 110 is received therein. In addition, the first supporting part 173 may be higher than the inner sidewalls 171b and 172b of the first receiving part 171 and the second receiving part 172, so that the outer sidewalls 171a and 172a of the first receiving part 171 and the second receiving part 172 may surround outer sidewalls of the first collector plate 121 and the second collector plate 131. In addition, the first supporting part 173 may be flatly formed, so that a flat top surface thereof may tightly contact a lower insulation member 156 positioned on a bottom surface of the cap plate 151. That is to say, the first supporting part 173 may be formed substantially perpendicularly to the first receiving part 171 and the second receiving part 172.

As illustrated in FIG. 4, the second retainer 180 may include a first connection part 181, a second connection part 182, and a second supporting part 183.

The first connection part 181 and the second connection part 182 have coupling holes 181e and 182e into which the second regions 121b, 131b of the first collector plate 121 and the second collector plate 131 are inserted. The first connection part 181 and the second connection part 182 may include outer sidewalls 181a and 182a, inner sidewalls 181b and 182b, left and right walls 181c, 181d, 182c, and 182d connecting the outer sidewalls 181a and 182a and the inner sidewalls 181b and 182b, respectively, and pillar parts 181g and 182g connecting the outer sidewalls 181a and 182a and the inner sidewalls 181b and 182b.

Here, slits 181f and 182f are formed in the inner sidewalls 181b and 182b in left and right sides of the pillar parts 181g and 182g in an up-down direction. The slits 181f ad 182f provide spaces in which the second region 121b and 131b of the first collector plate 121 and the second collector plate 131 are received in the first connection part 181 and the second connection part 182, thereby allowing the first collector plate 121 and the second collector plate 131 to be assembled with the first connection part 181 and the second connection part 182 more easily. That is to say, the second retainer 180 includes the slits 181f ad 182f formed in the left and right sides of the pillar parts 181g and 182g. As a result, the first coupling hole 181e and the second coupling hole 182e are formed at opposing sides of the pillar parts 181g and 182g. However, example embodiments do not limit the slits to those illustrated herein. For example, the slits 181f ad 182f may be formed to correspond to the second regions of the first collector plate 121 and the second collector plate 131. In addition, the first electrode uncoated region 111a and the second electrode uncoated region 112a may be connected to the first collector plate 121 and the second collector plate 131 through the first coupling hole 181e and the second coupling hole 182e. Further, protrusions 181h and 182h may be formed on one side surface or opposing side surfaces of the pillar parts 181g and 182g, and the coupling holes 121c, 131c may be formed in the second regions of the first collector 121 and the second collector plate 131. That is to say, the protrusion 181h and 182h outwardly protrude from one side surface or opposing side surfaces of the pillar parts 181g and 182g. The protrusions 181h and 182h may be engaged with the coupling holes 121c and 131c formed in the second regions 121b and 131b of the first collector plate 121 and the second collector plate 131, so that the second regions 121b and 131b of the first collector plate 121 and the second collector plate 131 may be assembled with the second retainer 180.

The first connection part 181 and the second connection part 182 may be a first sidewall (181 of FIG. 6) and a second sidewall (182 of FIG. 6) formed to surround opposing side surfaces of the electrode assembly 110 positioned under the second regions 121b and 131b of the first collector plate 121 and the second collector plate 131.

The second supporting part 183 may be formed to connect bottom portions of the first connection part 181 and the second connection part 182. Here, portions where the first connection part 181 and the second connection part 182 are connected with the second supporting part 183 may have curved sections. That is to say, the portions where the first connection part 181 and the second connection part 182 are connected with the second supporting part 183 are curved, so that the electrode assembly 110 is received inside. In addition, the second supporting part 183 may be flatly formed, so that its flat bottom surface tightly contacts a bottom surface of the case 140. That is to say, the second supporting part 183 may be formed substantially perpendicularly to the first connection part 181 and the second connection part 182. Here, a top surface of the second supporting part 183 may tightly contact a bottom surface of the electrode assembly 110.

The case 140 may receive the electrode assembly 110, the first electrode terminal 122, and the second electrode terminal 132. The electrode assembly 110 may be received in the case 140 together with an electrolyte.

The cap assembly 150 may be coupled to the case 140. Specifically, the cap assembly 150 may include a cap plate 151, a seal gasket 152, a plug 153, a safety vent 154, an upper insulation member 155, and a lower insulation member 156. The cap plate 151 seals an opening of the case 140 and may be made of the same material as the case 140.

The seal gasket 152 is formed to seal portions between the first electrode terminal 122 and the cap plate 151, and between the second electrode terminal 132 and the cap plate 151 using an insulating material.

The plug 153 seals an electrolyte injection hole 151a of the cap plate 151. The safety vent 154 may be installed in a vent hole 151b of the cap plate 151 and may include a notch 154a to be opened at a predetermined pressure.

The upper insulation member 155 is formed between each of the first terminal plate 123 and the second terminal plate 133 and the cap plate 151. The upper insulation member 155 insulates each of the first terminal plate 123 and the second terminal plate 133 from the cap plate 151.

The lower insulation member 156 is formed between each of the first collector plate 121 and the second collector plate 131 and the cap plate 151. The lower insulation member 156 prevents unnecessary electric shorts from being generated. In addition, the lower insulation member 156 may also be formed between each of the first electrode terminal 122 and the second electrode terminal 132 and the cap plate 151 to prevent electric shorts from being generated between each of the first electrode terminal 122 and the second electrode terminal 132 and the cap plate 151.

Therefore, the rechargeable battery according to the embodiment may fix, e.g., stabilize, the electrode assembly by coupling the first and second retainers to the top and bottom portions, respectively, of the collector plate. As such, the electrode assembly may be prevented from being damaged due to external impacts, and may exhibit improved electrical reliability due to preventing electric shorts.

FIGS. 5A to 5D are perspective views illustrating a process of assembling a rechargeable battery according to an embodiment. First, it is assumed that the first terminal 120 and the second terminal 130 are assembled with the cap assembly 150.

Referring to FIG. 5A, the first retainer 170 is placed under the first collector plate 121 and the second collector plate 131, and is moved toward first regions 121a and 131a of the first collector plate 121 and the second collector plate 131 to be engaged with the receiving holes 171 and 172 of the first retainer 170. Here, the outer sidewalls 171a and 172a of the first receiving part 171 and the second receiving part 172 tightly contact the bottom surface of the cap plate 151, and the inner sidewalls 171b and 172b of the receiving holes 171 and 172 tightly contact bottom surfaces of the first regions 121a and 131a of the first collector plate 121 and the second collector plate 131.

Figure 5B:
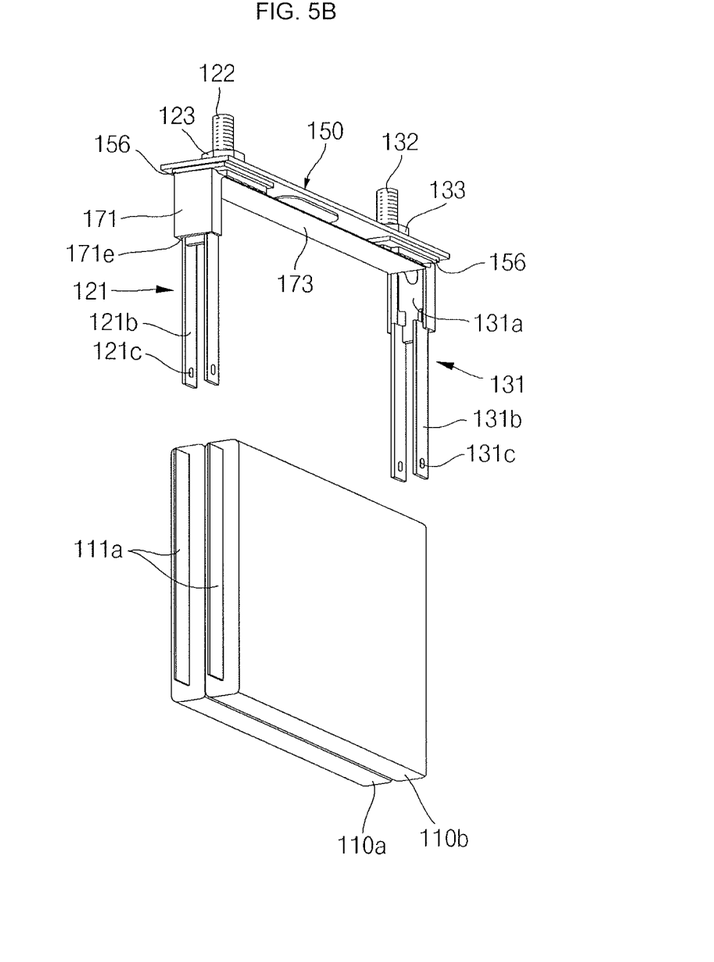

Referring to FIG. 5B, the electrode assembly 110 is placed in the bottom portions of the first collector plate 121 and the second collector plate 131 connected with the first retainer 170. That is, the electrode assembly 110 is coupled to an internal space formed by the first receiving part 171 and the second receiving part 172 of the first retainer 170 and the first supporting part 173. That is to say, the electrode assembly 110 may be tightly contacted to the inside of the first retainer 170, so the first and second electrode uncoated regions 111a and 112a of the electrode assembly 110 may be welded to the first collector plate 121 and the second collector plate 131. For example, the top surface of the electrode assembly 110 may be tightly coupled to the first supporting part 173 of the first retainer 170.

Figure 5C:
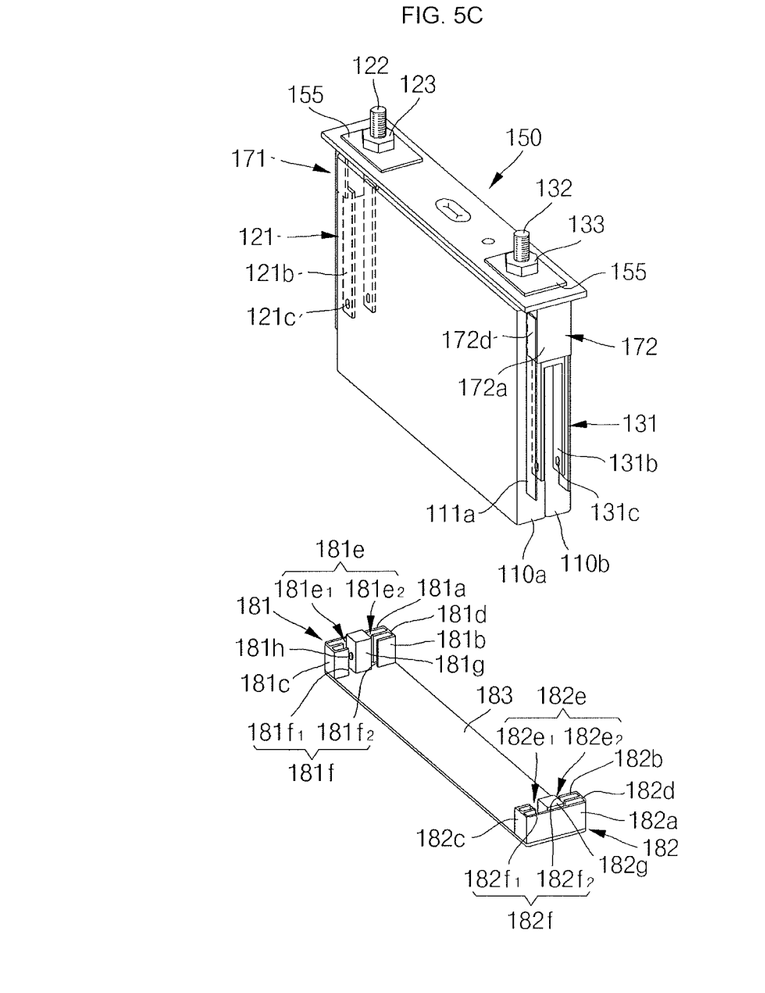

Referring to FIG. 5C, the second retainer 180 is placed in the bottom portions of the first collector plate 121 and the second collector plate 131 connected with the electrode assembly 110, and is moved toward the second regions 121b and 131b of the first collector plate 121 and the second collector plate 131 to be engaged with the coupling holes 121c and 131c of the second retainer 180. The bottom surface of the electrode assembly 110 may tightly contact the second supporting part 183 of the second retainer 180.

Figure 5D:
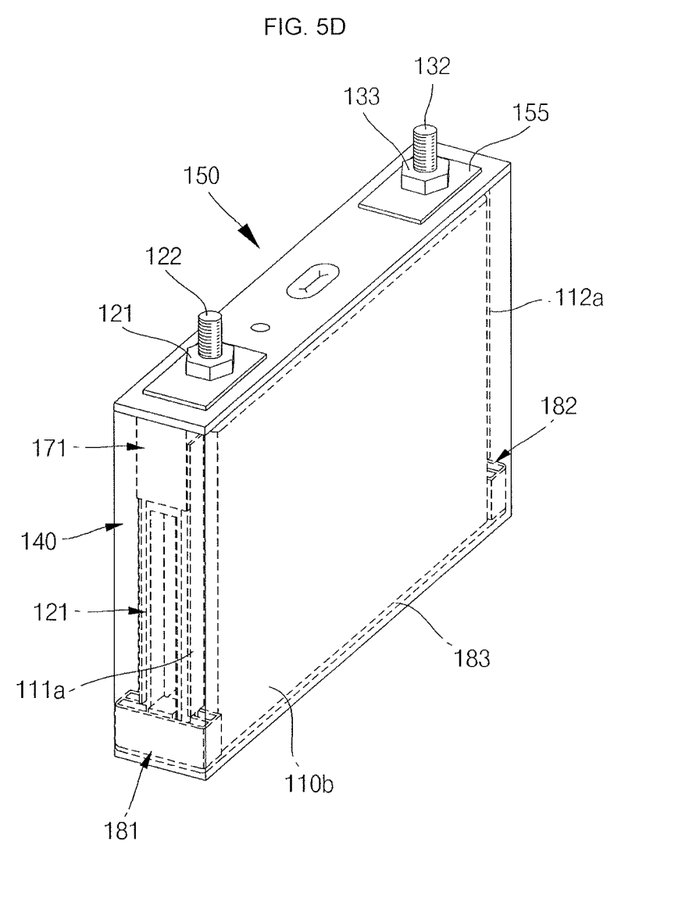

Referring to FIG. 5D, the first collector plate 121 and the second collector plate 131 connected with the first retainer 170 and the second retainer 180 are received in the case 140. The internal bottom surface of the case 140 may tightly contact the bottom surface of the second supporting part 183.

Figure 6:
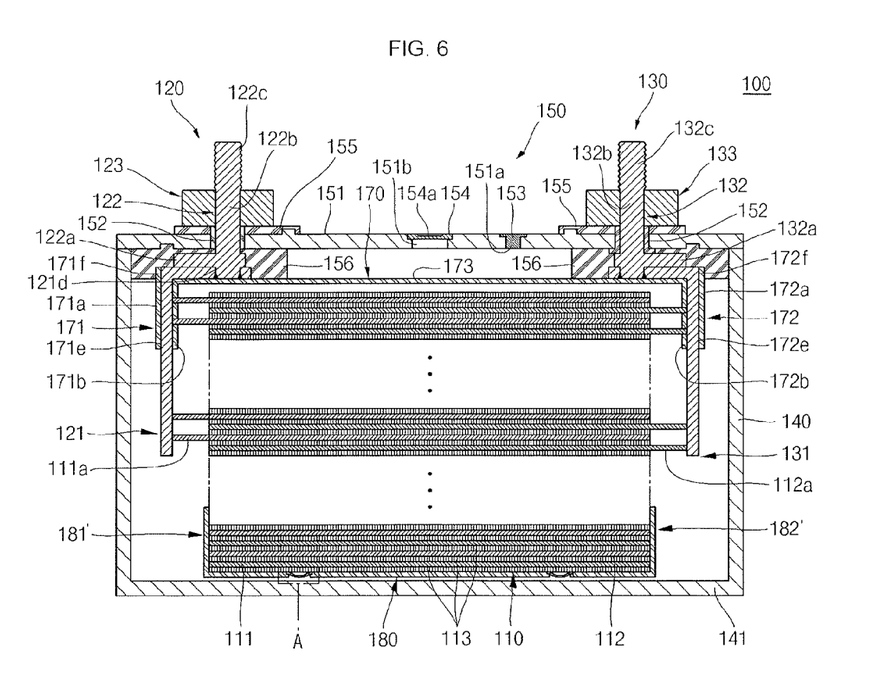
FIG. 6 illustrates a cross-sectional view of a rechargeable battery according to another embodiment.
Figure 7:
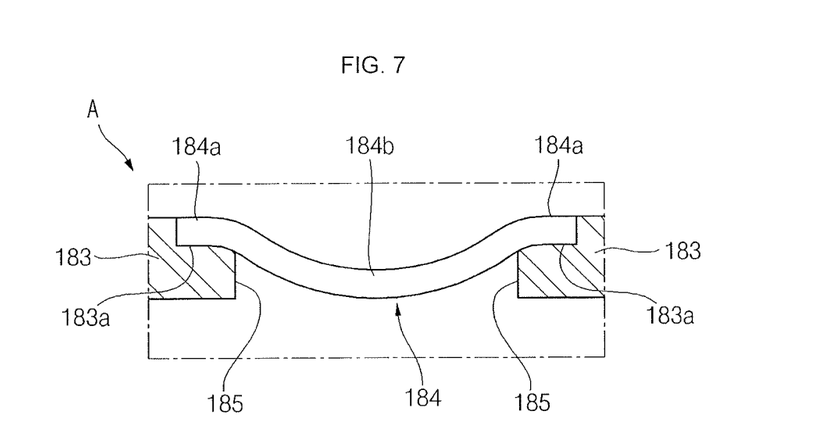
FIG. 7 illustrates an enlarged cross-sectional view of a portion 'A' of FIG. 6.

FIG. 6 is a cross-sectional view of a rechargeable battery according to another embodiment. FIG. 7 is an enlarged cross-sectional view of a portion 'A' of FIG. 6.

Referring to FIGS. 6 and 7, the rechargeable battery according to the embodiment may include at least one opening hole 185 formed in the second supporting part 183 of the second retainer 180. The opening hole 185 may include an elastic plate 184 having an elastic force. In addition, the second retainer 180 may include first and second connection parts 181' and 182' that are configured to surround opposing side surfaces of the electrode assembly 110 positioned under second region 121b and 131b of the first collector plate 121 and the second collector plate 131, e.g., extend along opposite surfaces of the electrode assembly 110 and in contact therewith. As the second supporting part 183 connects the first connection part 181' and the second connection part 182', the opposing side surfaces of the electrode assembly 110 may be surrounded by the first sidewall 181' and the second sidewall 182'. As such, the electrode assembly 110 may be stabilized, so damaged to the electrode assembly 110 due to external impacts may be prevented or substantially minimized.

The elastic plate 184 may include a downwardly convex round part 184b and an edge part 184a. The round part 184b may be formed to contact a bottom surface of the case 140. When an external vibration is applied to the case 140, the round part 184 absorbs vibration energy, thereby improving durability. The edge part 184a may be configured such that opposite ends of the elastic plate 184 are fixed to the second supporting part 183 of the second retainer 180. Therefore, in order to allow the opposite ends of the elastic plate 184 to be fixed to the second supporting part 183 of the second retainer 180, a stepped portion 183a may be formed at an end of the edge part 184a to be connected with the opposite ends of the elastic plate 184. Therefore, in the rechargeable battery according to the embodiment, the elastic plate 184 may be coupled to the second retainer 180, thereby improving durability by imparting elasticity during welding and absorbing vibration energy.

As described above, in the rechargeable battery according to example embodiments, an electrode assembly can be fixed and damages due to external impacts can be prevented by coupling first and second retainers to a collector plate, thereby improving electrical reliability by preventing electrical shorts. In addition, an elastic plate may be allowed to serve as an elastic body during welding by coupling an elastic plate to a second retainer, and durability of the rechargeable battery can be improved by absorbing vibration energy.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope as set forth in the following claims.

What is claimed is:

1. A rechargeable battery, comprising:
   an electrode assembly including a first electrode having a first electrode uncoated region at a first end of the electrode assembly, a second electrode having a second electrode uncoated region at a second end of the electrode assembly opposite the first end, and a separator interposed between the first and second electrodes;
   a first current collecting plate and a second current collecting plate spaced apart from each other, the first and second current collecting plates being electrically connected to the first and second electrode uncoated regions, respectively;
   a case configured to receive the electrode assembly, the first current collecting plate, and the second current collecting plate;
   a cap plate configured to seal the case;
   a first electrode terminal and a second electrode terminal extending through the cap plate, the first and second electrode terminals being electrically connected to the first and second current collecting plates, respectively;
   a first retainer adjacent to the cap plate, the first retainer being coupled to a first region of each of the first and second current collecting plates; and
   a second retainer coupled to a second region of each of the first and second current collecting plates or to each of the first and second electrode uncoated regions, the second retainer being separated from the first retainer, and the second regions of the first and second current collecting plates being different from the first regions of the first and second current collecting plates,
   wherein the first retainer includes:
   a first receiving part and a second receiving part, each of the first and second receiving parts having a receiving hole, and the first region of each of the first and second current collecting plates being inserted into a respective receiving hole, each of the first and second receiving parts overlapping at least four different surfaces of a respective inserted first region of the first and second current collecting plates, and
   a first supporting part connecting tops of the first receiving part and the second receiving part, the first supporting part being a horizontal portion of the first retainer parallel to the cap plate, and wherein the second retainer includes:
a first connection part and a second connection part, each of the first and second connection parts having coupling holes, and the second regions of each of the first and second current collecting plates being inserted into respective coupling holes, and
a second supporting part connecting the first connection part and the second connection part, the second supporting part being parallel to the cap plate and overlapping a bottom of the electrode assembly.

2. The rechargeable battery as claimed in claim 1, wherein:
the first regions of the first and second current collecting plates are connected to the first and second electrode terminals, respectively; and
the second regions of the first and second current collecting plates extend from respective first regions, the second regions being bent with respect to the first regions.

3. The rechargeable battery as claimed in claim 1, wherein the first supporting part is perpendicular to each of the first receiving part and the second receiving part.

4. The rechargeable battery as claimed in claim 1, wherein each of the first receiving part and the second receiving part further comprises:
outer sidewalls and inner sidewalls overlapping opposite surfaces of the respective first and second current collecting plates inserted therein, the inner sidewalls having an opening hole open in a vertical direction; and
left sidewalls and right sidewalls, the left and right sidewalls connecting the outer sidewalls and the inner sidewalls along outermost surfaces of the respective first and second current collecting plates.

5. The rechargeable battery as claimed in claim 4, wherein the first electrode uncoated region and the second electrode uncoated region are connected to the first current collecting plate and the second current collecting plate through the opening holes of respective first and second receiving parts of the first retainer.

6. The rechargeable battery as claimed in claim 1, wherein the second supporting part is perpendicular to each of the first connection part and the second connection part.

7. The rechargeable battery as claimed in claim 1, wherein each of the first connection part and the second connection part includes:
outer sidewalls and inner sidewalls, the inner sidewalls including slits;
left and right sidewalls connecting the outer sidewalls and the inner sidewalls; and
pillar parts connecting the outer sidewalls and the inner sidewalls, the pillars being arranged to have the slits in left and right sides thereof in a vertical direction.

8. The rechargeable battery as claimed in claim 7, wherein the second retainer further comprises a first coupling hole and a second coupling hole at respective first and second sides of the pillar parts.

9. The rechargeable battery as claimed in claim 8, wherein:
the pillar parts further comprise protrusions on at least one side surface of each pillar part; and
the second regions of the first and second current collecting plates include coupling holes.

10. The rechargeable battery as claimed in claim 9, wherein the protrusions are coupled to the coupling holes.

11. The rechargeable battery as claimed in claim 1, wherein the second supporting part tightly contacts a bottom surface of the case.

12. The rechargeable battery as claimed in claim 1, wherein the first connection part and the second connection part include a first sidewall and a second sidewall, respectively, and the first sidewall and the second sidewall surround either side surfaces of the electrode assembly positioned under the second regions of the first and second current collecting plates.

13. The rechargeable battery as claimed in claim 1, wherein the first supporting part overlaps a majority of a horizontal section of each of the first and second current collecting plates directly thereon.

* * * * *